UNITED STATES PATENT OFFICE.

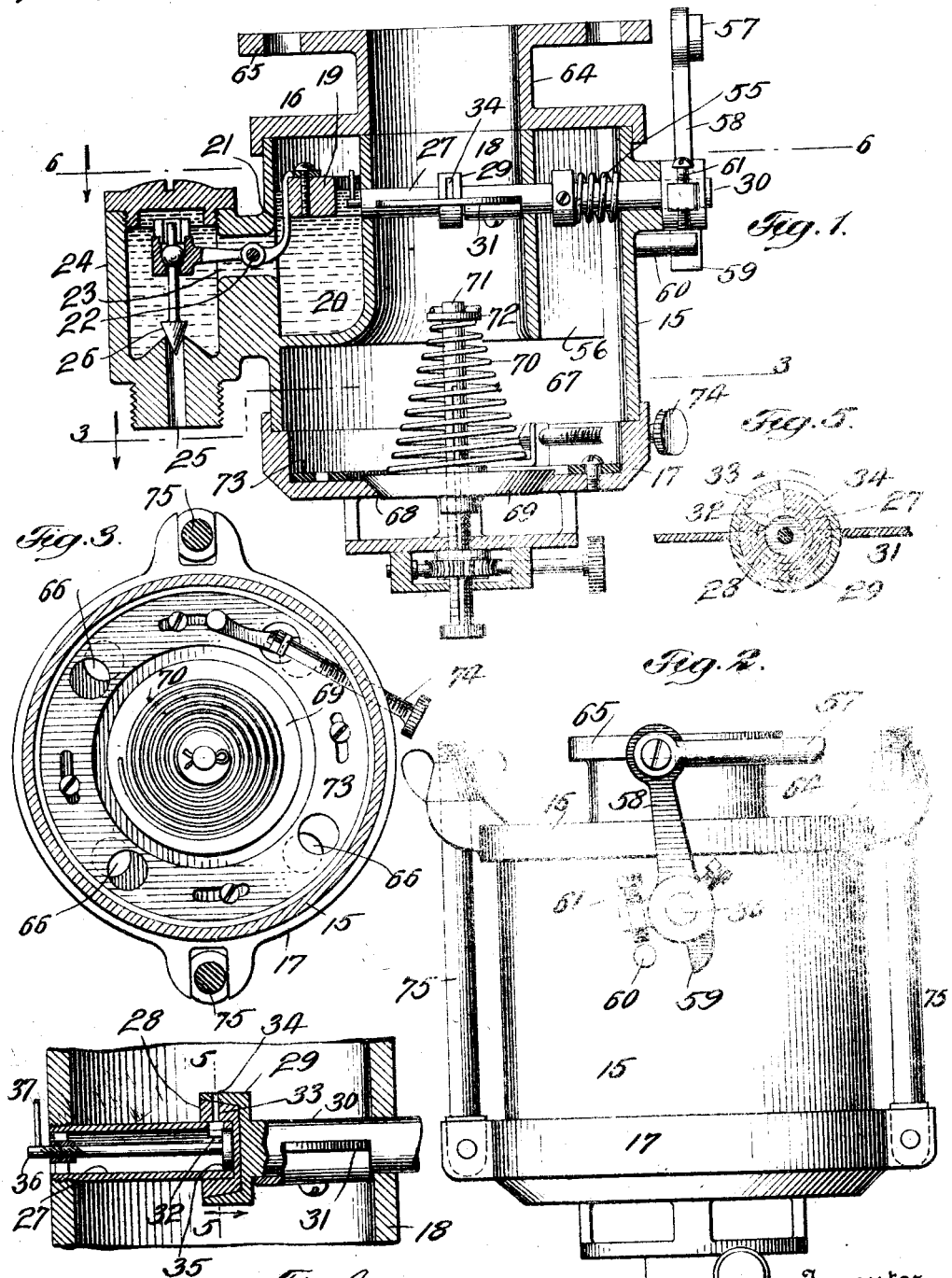

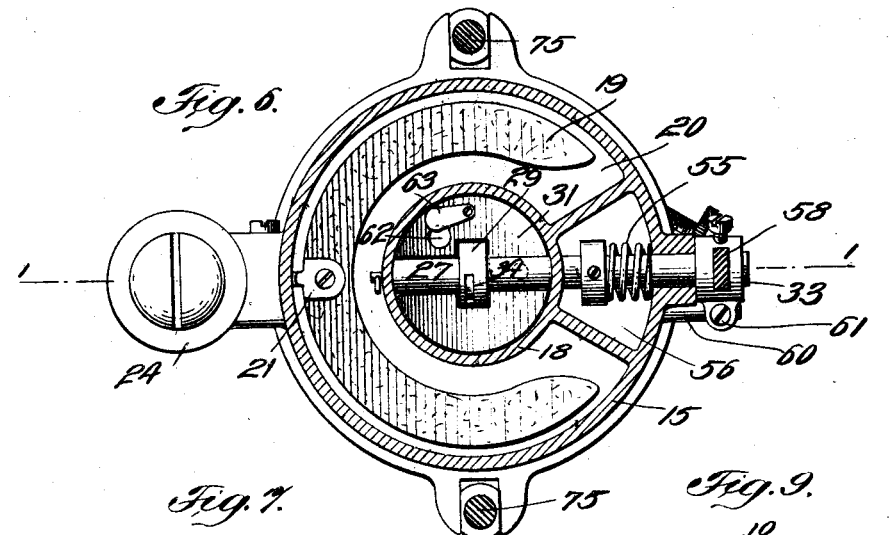
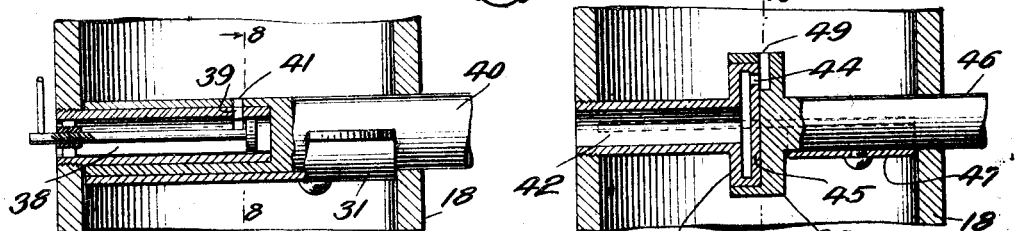
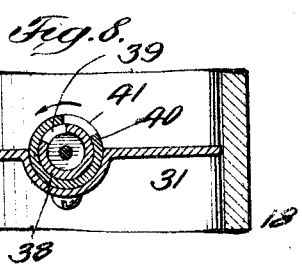
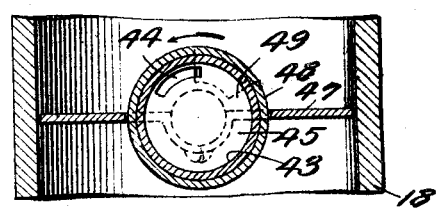
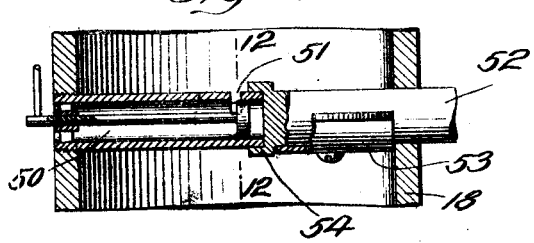
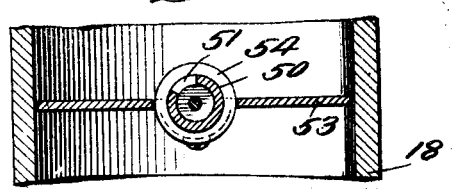

THADDEUS B. EIKER, OF ASBURY PARK, NEW JERSEY.

CARBURETER.

1,132,314.  Specification of Letters Patent.  Patented Mar. 16, 1915.

Application filed February 1, 1912. Serial No. 674,674.

*To all whom it may concern:*

Be it known that I, THADDEUS B. EIKER, a citizen of the United States, and a resident of Asbury Park, in the county of Monmouth and State of New Jersey, have invented certain new and useful Improvements in Carbureters, of which the following is a specification.

The invention relates to improvements in carbureters for hydrocarbon engines, and it consists in the novel features, arrangements and combinations of parts hereinafter described, and particularly pointed out in the claims.

The object of my invention is to provide a simple and highly efficient carbureter for automatically supplying gas of the requisite quantity and quality to the cylinder of an engine, in accordance with the work to be performed.

I contemplate the use of my carbureter in connection with the cylinders of automobile engines for supplying gas thereto.

The carbureter of my invention comprises preferably a cylindrical casing affording a mixing chamber for the air and gas to be connected by suitable piping with the engine cylinder, and a receptacle for the gasolene, said receptacle surrounding the mixing chamber and to be connected with a suitable tank or source of supply for the gasolene.

The receptacle containing the gasolene will be provided with a float for closing, when the desired quantity of gasolene has entered said receptacle, a valve controlling the inflow of gasolene from the tank or other source of supply to the receptacle, and said receptacle will be connected by a suitable tube or pipe and valve mechanism with the mixing chamber of the carbureter, said valve mechanism being adapted to permit of a variable discharge of the gasolene in accordance with the requirements, and preferably being located at the pivotal axis of and discharging above a suitable valve of the butterfly type employed for controlling the passage of air from the lower to the upper portion of said chamber. The mixing chamber is provided at its lower portion with a suitable air inlet and an automatic check valve therefor. The butterfly valve controlling the passage through the mixing chamber and the valve or control mechanism for securing the variable discharge of gasolene, are preferably connected together and operate synchronously to admit proper proportions of air and gasolene to said chamber above the butterfly valve in accordance with the work required, whereby as the butterfly or air valve is turned to increase the opening through the mixing chamber, the said valve mechanism will likewise open to a greater extent to supply the requisite quantity of gasolene to the increased quantity of air then passing through the carbureter. I provide the butterfly valve with a reasonably small opening extending through the same and equip said valve with a shutter by which this opening may be more or less opened or closed, thereby adapting the carbureter for the various conditions to be met in practice.

My invention results in the attainment of proper combustion, high efficiency in the engine and great economy in the consumption of the gasolene, as well as accomplishing other important advantages.

The invention will be fully understood from the detailed description hereinafter presented, reference being had to the accompanying drawings, in which:

Figure 1 is a central vertical section through a carbureter embodying my invention, the section being on the dotted line 1—1 of Fig. 6; Fig. 2 is a side elevation of the carbureter, the view being taken from the right hand side of Figs. 1 and 6; Fig. 3 is a horizontal section through the lower portion of the carbureter on the dotted line 3—3 of Fig. 1; Fig. 4 is an enlarged vertical section through a portion of the mixing chamber and illustrates a portion of the butterfly valve in edge elevation and the valve mechanism for controlling the discharge of the gasolene above said valve in section; Fig. 5 is a transverse section through a portion of the butterfly valve and the gasolene discharge valve mechanism on the dotted line 5—5 of Fig. 4; Fig. 6 is a horizontal section through the carbureter on the dotted line 6—6 of Fig. 1; Fig. 7 is a view corresponding with Fig. 5, but showing a modification in the construction of the valve mechanism for securing a variable discharge of the gasolene above the butterfly valve; Fig. 8 is a sectional view of the same.

taken on the dotted line 8—8 of Fig. 7; Fig. 9 is a view corresponding substantially with Figs. 4 and 7 and illustrating a further modified construction of gasolene discharge valve mechanism; Fig. 10 is a vertical section through the same, taken on the dotted line 10—10 of Fig. 9; Fig. 11 is a section illustrating a further modification in the form of the discharge for the gasolene above the butterfly valve, and Fig. 12 is a section through the same taken on the dotted line 12—12 of Fig. 11.

In the drawings, 15 designates the exterior cylindrical shell or casing of the carbureter, 16 a top plate thereon, 17 a bottom plate or cap applied thereto, 18 a vertical tubular section concentric with and within the said exterior casing and forming within it the mixing chamber or conduit for the air and gas, and 19 a semi-circular float within the gasolene receptacle 20 formed between the exterior casing 15 and tubular section 18, said float being connected to a plate 21, which is pivotally secured at 22 within a passage 23 leading from a gasolene receptacle 24, which may be integral with the casing 15. The gasolene for the supply of the carbureter enters the receptacle 24 through an inlet 25 controllable by a valve 26 in a well known manner. I make no specific claim for the receptacle 24, since it furnishes merely the intermediate chamber through which the gasolene flows to the main gasolene receptacle 20. The movement of the float 19 operates through the pivoted plate 21, as the gasolene lowers in the receptacle 20, to open the valve 26, so that an additional supply of the gasolene may flow into the receptacle 20. When the float 19 is elevated by an admission of a proper quantity of gasolene to the receptacle 20, it acts to turn the outer end of the plate 21 downwardly within the receptacle 24 and permits or effects the seating of the valve 26 and the cutting off of any further supply of gasolene through the inlet 25.

The outlet for gasolene from the receptacle 20 to the mixing chamber in the casing 18 is through a tube 27 communicating with the receptacle 20 and extending transversely inwardly into said mixing chamber, and a valve mechanism located at the inner end of said tubing 27 and, in the construction shown in Figs. 1, 4 and 5, comprising a stationary hub 28 on the inner end of said tube 27 and a rotary cap 29 fitting upon said hub and connected with the shaft 30 which carries the butterfly valve 31. The tube 27 has in the side of its inner end a slot 32, and this slot is in line with a dove-tail-shaped slot 33 in the hub 28, as shown more clearly in Fig. 5. The cap 29 is provided with a slot 34 which on the rotation of said cap with the butterfly valve 31 enters more or less into register with the slot 33 in the hub 28, and consequently exposes the gasolene in the tube 27 and slots 32, 33 in a greater or less degree to the suction action of the engine. When the butterfly valve 31 extends horizontally across the mixing chamber or is in the starting position, a very slight portion of the slot 34 is in register with the slot 33, as shown in Fig. 5, but in accordance with the work required the butterfly valve 31 is, after the engine has been started, turned to carry an increased extent of the slot 34 into register with the slot 33 and admit an increased supply of air up into the mixing chamber 18. The slot 34 is in its movement timed with the movement of the butterfly valve 31, and hence as the valve 31 is turned to admit a greater or less quantity of air to the mixing chamber, the slot 34 is likewise moved to expose a greater or less extent of the slot 33 and the gasolene therein to the suction action of the engine. The discharge of the gasolene is at the upper side of the valve 31 and at the upper portion of the mixing chamber 18.

Within the tube 27 I preferably provide an adjustable disk valve 35, the same being secured on the inner end of a rod 36 extending through a threaded opening in a bearing at the outer end of the tube 27 and provided with a crank member 37 by which the rod may be conveniently rotated. The disk 35 is at the extreme inner end of the tube 27 and its purpose is to enable the adjustment of the slot 32 in said tube with respect to the extent thereof which shall be exposed. If, looking at Fig. 4, the rod 36 is turned to draw the valve disk 35 toward the left, said disk will partly close the slot 32 and to that extent restrict the opening through which the gasolene may escape to the mixing chamber. The disk valve 35 is desirable in that it enables the adjustment of the carbureter to the wants of the particular engine to which it may be applied.

I do not wish to limit my invention to the identical valve mechanism illustrated in Figs. 1, 4 and 5 for controlling the discharge of the gasolene, since I am aware that said valve mechanism may be modified in many ways in accomplishing the purposes of my invention. I have, therefore, illustrated in Figs. 7 to 12 inclusive several modified constructions of the gasolene discharge feature, all of them providing for the discharge of the gasolene above the butterfly valve and in the upper portion of the mixing chamber. The constructions shown in Figs. 7 to 12 inclusive do not modify the construction of the tubular section 18 affording the mixing chamber, nor the construction of the butterfly valve 31, or the operation of said valve. In Fig. 7 I letter the tube 38 which is stationary with the section 18 and through which the gasolene flows from the main receptacle 20 on its way to the mixing chamber, and said tube 38 has formed in its side near its inner end a slot 39 and preferably will contain a disk valve corresponding with the valve 35 shown in Fig. 4. The rotary shaft carrying the butterfly valve I number 40, and this shaft is made tubular at its inner end to slip over and rotate upon the tube 38. The tubular portion of the shaft 40 is provided with a slot 41, which is in the same vertical plane with the slot 39 in the tube 38 and on the rotation of the shaft 40 is brought more or less into register with said slot 38 for identically the same purpose that, in the construction shown in Figs. 4 and 5, the slot 34 is turned more or less into register with the slot 33 according to the position of the butterfly valve and the requirements of the engine. In the construction shown in Figs. 7 and 8 I employ a stationary slotted member and a rotary slotted member coöperating therewith and operable in time with the butterfly valve 31 to control the discharge of gasolene in accordance with the position of the valve 31 and the requirements of the engine and said construction will be readily understood without further detailed explanation. In the construction shown in Figs. 9 and 10 the inlet tube for gasolene is numbered 42 and has at its inner end a hub 43 within which is formed a disk-like chamber having an outlet through an arcuate slot 44 formed in the outer wall 45 of said chamber. Upon the inner end of the rotary shaft 46 carrying the butterfly valve 47 is provided a cap 48 which fits upon the hub 43, and contains a slot 49, which, as indicated in Fig. 10, may be moved more or less into register with the slot 44 in said hub 43 for the purpose of regulating the extent of opening to the gasolene exposed to the suction action of the engine. The construction shown in Figs. 9 and 10, while a modification of the construction of Fig. 5, has a similar operation to that thereof. In Figs. 11 and 12 I number the inlet tube for gasolene 50, and this tube will preferably contain a disk valve corresponding with the disk valve shown in Fig. 4 and have in the side of its inner end a slot 51 for the escape of the gasolene. The rotary shaft 52 carrying the butterfly valve, which I number 53 in this modification, has at its inner end a cap 54 fitting upon the inner end of the stationary tube 50. In the use of the construction shown in Figs. 11 and 12 I may adjust the size of the opening 51 by means of the disk-valve in the tube 50, and thereafter said opening will remain uncovered, since the cap 54 does not extend over said opening 51. The opening 51 is, however, above the butterfly valve and in the upper portion of the mixing chamber.

In each of the mechanisms shown in Figs. 4 and 7 to 12 inclusive, the rotary shaft numbered 30 in the construction shown in Figs. 1 to 4, is spring-pressed toward the stationary gasolene discharge tube, numbered 27 in Fig. 4, by means of a coiled spring 55 on said shaft and acting expansively between the side wall of the exterior shell or casing 15 and a collar on the shaft, as illustrated in Figs. 1 and 6, said spring and collar being within a chamber 56 partitioned off from the general receptacle 20. The shaft carrying the butterfly valve is subject to the manual control of the operator or driver through suitable mechanism, comprising for illustration a link or rod 57 pivotally connected with the upper end of a crank arm 58 fastened by a screw to the outer end of the shaft, as shown in Figs. 1 and 2. The throw of the crank arm 58 and butterfly valve may be limited or regulated by means of a toe 59 on the crank arm 58 and a stop 60 to be engaged by said toe at the end of the limit of movement in one direction of the crank arm and by an adjustable stop 61 on said crank arm at the end of the limit of movement in the opposite direction of said arm.

Various mechanisms may be provided for operating the butterfly valve and its shaft and of controlling the movements of said valve.

The valve 31 is preferably formed with an opening 62 for the passage of a limited quantity of air through it when the valve is closed, and for the purpose of regulating the size of said opening and consequently the quantity of air that may be able to pass through it to meet any special conditions that may arise, I provide the valve 31 with a pivoted shutter or damper 63 which may be turned to a greater or less extent over said opening 62 and thus control the size thereof.

The upper or cap plate 16 has a central tubular extension 64, whose bore constitutes a continuation of the mixing chamber and which extension 64 carries upon its upper edge a plate 65 by means of which the carbureter may be connected by screws to the usual pipe leading to the engine cylinder.

The bottom plate or cap 17 has air inlets 66 along its edge leading into an interior air chamber 67 formed in the lower part of the casing 15, and also a large central air inlet or opening 68 leading to said chamber but normally kept closed by a check valve 69 held on its seat by a coiled spring 70. During the use of the carbureter the valve 69 will be automatically opened to a greater or less extent, as may be required, by the suction created by the piston of the engine on its suction strokes. The spring 70 is held against the valve 69 by a stem 71 and washer 72. The stem 71 may be adjusted vertically by a usual type of worm mechanism, shown in Figs. 1 and 2 or in any other suitable way, as by a wing-nut applied to its lower end and screwing against a rigid part of the casing 15. The air inlets 66 in the lower cap 17 may be regulated as to their size or exposure by a rotary register plate 73 of usual character and operable by means of a screw 74.

The top and bottom plates 16, 17 may be removably clamped against the ends of the casing 15 by means of rods 75 hingedly secured between ears formed on the lower cap and adapted to extend between ears formed on the upper cap and having wing-nuts upon their upper ends adapted to be screwed downwardly against the ears on said upper cap, as will be understood on reference to Figs. 2, 3 and 6. By releasing the wing-nuts carried by the rods 75, said rods may be turned outwardly and permit the casing 15 and all its parts below the top plate 16 to be removed from the vehicle, this being a feature of advantage.

The operation of the carbureter will be understood from the foregoing description without further extended detailed explanation.

The carbureter having been applied in position and the receptacle 20 having been supplied with gasolene, the operation of the air or butterfly valve 31 and the gasolene discharge valve mechanism above said butterfly valve will, with the exception of the construction shown in Fig. 11, be under the direct control of the driver on the car through the medium of a connecting rod 57, crank-arm 58 and shaft 30, this shaft carrying the butterfly valve and one member of said gasolene discharge valve mechanism. The suction stroke of the piston of the engine will be depended on, in the form of my invention illustrated, for opening the air valve 69. The driver will open the butterfly valve 31 and the valve mechanism controlling the discharge of gasolene to a greater or less extent, as the requirements of the engine may demand.

It is one of the important features of the invention that the driver may regulate the quantity of gasolene that shall escape to the mixing chamber and that at the same time he may control by the position of the valve 31 the quantity of air in said chamber to mix with the gasolene. The operation of the valve 31 and the gasolene discharge valve mechanism, in its several forms shown, will be readily understood from the description hereinbefore given. In respect to the construction shown in Figs. 11 and 12, the outlet 51 for gasolene, while capable of being adjusted as to size, has no other control features connected with it, and in that respect it differs from the valve constructions shown in the other figures of the drawing. In the construction shown in Fig. 11 the butterfly valve is carried by the shaft 52 and the discharge 51 for gasolene is above said valve and in the upper portion of the mixing chamber, and this represents an improvement over all prior art carbureters known to me. I prefer, however, to use the valve mechanism shown in Fig. 4 or Figs. 7 or 9, so that variable quantities of gasolene may enter the mixing chamber with the proper quantities of air, in accordance with the loads imposed on the engine.

What I claim as my invention and desire to secure by Letters-Patent, is:

1. A carbureter comprising a casing, a mixing-chamber for the air and gasolene or the like, a rotary butterfly valve within and controlling the passage through said chamber and having an opening through it, and a valve mechanism within said chamber for controlling the escape of the gasolene, said valve mechanism comprising coöperative engaging members having a variable discharge outlet for gasolene and one being connected with said controlling valve and movable therewith to vary its relation to the other member and the size of said outlet in accordance with the position of said valve.

2. A carbureter comprising a casing, a mixing-chamber for the air and gasolene or the like, a rotary butterfly valve within and controlling the passage through said chamber and having an opening and an adjustable damper for said opening, and a valve mechanism within said chamber for controlling the escape of the gasolene, said valve mechanism comprising coöperative engaging members having a variable discharge outlet for gasolene and one being connected with said controlling valve and movable therewith to vary its relation to the other member and the size of said outlet in accordance with the position of said valve.

3. A carbureter comprising a casing, a mixing-chamber for the air and gasolene or the like, a rotary butterfly valve within and controlling the passage through said chamber, and a valve mechanism within said chamber for controlling the escape of the gasolene, said valve mechanism comprising coöperative engaging members having a variable discharge outlet for gasolene and one being connected with said controlling valve and movable therewith to vary its relation to the other member and the size of said outlet in accordance with the position of said valve.

4. A carbureter comprising a casing, a mixing-chamber for the air and gasolene or the like, a rotary butterfly valve within and controlling the passage through said chamber, a receptacle for gasolene or the like exterior to said chamber, a pipe extending transversely into said chamber from said receptacle and having an outlet opening therein for gasolene closely adjacent to said butterfly valve, and an operating shaft carrying said valve and extending transversely into said chamber, said operating shaft having within said chamber an outlet opening in coöperative relation with and to be moved more or less into register with the outlet opening in said pipe to vary the gasolene discharge in accordance with the position of said valve.

Signed at New York city, in the county of New York and State of New York, this 31st day of January, A. D. 1912.

THADDEUS B. EIKER.

Witnesses:
ARTHUR MARION,
CHAS. C. GILL.